United States Patent
Lu et al.

(10) Patent No.: US 10,169,940 B1
(45) Date of Patent: Jan. 1, 2019

(54) ELECTRIC LOCK AND CONTROL METHOD THEREOF

(71) Applicant: TAIWAN FU HSING INDUSTRIAL CO., LTD., Kaohsiung (TW)

(72) Inventors: Shih-Min Lu, Kaohsiung (TW); Fu-Chih Huang, Kaohsiung (TW)

(73) Assignee: TAIWAN FU HSING INDUSTRIAL CO., LTD., Kaohsiung (TW)

( * ) Notice: Subject to any disclaimer, the term of this patent is extended or adjusted under 35 U.S.C. 154(b) by 0 days.

(21) Appl. No.: 15/966,001

(22) Filed: Apr. 30, 2018

(30) Foreign Application Priority Data

Jan. 4, 2018 (TW) .............................. 107100342 A

(51) Int. Cl.
  *G07C 9/00* (2006.01)
  *G06F 21/44* (2013.01)

(52) U.S. Cl.
  CPC ......... *G07C 9/00182* (2013.01); *G06F 21/44* (2013.01); *G07C 9/00142* (2013.01); *G07C 9/00857* (2013.01); *G07C 2009/00865* (2013.01)

(58) Field of Classification Search
  CPC .............. G07C 9/00142; G07C 9/0085; G07C 9/00182; G06F 21/44
  USPC .................................................. 340/5.6–5.65
  See application file for complete search history.

(56) References Cited

U.S. PATENT DOCUMENTS

| | | | | |
|---|---|---|---|---|
| 2003/0074936 | A1* | 4/2003 | Conforti | G07C 9/00103 70/277 |
| 2010/0185331 | A1* | 7/2010 | Pukari | E05B 47/0012 700/275 |
| 2013/0335193 | A1* | 12/2013 | Hanson | H04W 12/06 340/5.61 |
| 2014/0260452 | A1* | 9/2014 | Chen | G07C 9/00174 70/279.1 |
| 2017/0069154 | A1* | 3/2017 | Hilton | G07C 9/00182 |

FOREIGN PATENT DOCUMENTS

| | | |
|---|---|---|
| CN | 102304994 B | 6/2015 |
| CN | 103195301 B | 6/2015 |
| TW | M508579 U | 9/2015 |
| TW | 201623762 A | 7/2016 |
| TW | I591246 B | 7/2017 |
| TW | 201737162 A | 10/2017 |
| TW | 201738450 A | 11/2017 |

* cited by examiner

*Primary Examiner* — Allen T Cao
(74) *Attorney, Agent, or Firm* — Winston Hsu

(57) ABSTRACT

A control method includes the electric lock entering an administrator setting mode after receiving an administrator password; the electric lock generating an authentication code in the administrator setting mode; the electric lock wirelessly receiving a first input from a portable device; the electric lock comparing the first input with the authentication code; the electric lock pairing with the portable device and receiving unique identification information of the portable device when the electric lock determines that the first input matches the authentication code; the electric lock storing the unique identification information of the portable device; and the electric lock performing an unlocking operation when the electric lock receiving a second input and sensing the portable device having the unique identification information within a predetermined distance.

18 Claims, 8 Drawing Sheets

ELECTRIC LOCK AND CONTROL METHOD THEREOF

BACKGROUND OF THE INVENTION

1. Field of the Invention

The present invention relates to an electric lock and control method thereof, and more particularly, to an electric lock capable of authorizing a temporary user to set up an unlock setting and control method thereof.

2. Description of the Prior Art

Generally speaking, a conventional electric lock is to set a default password. A user has to input the default password to unlock the electric lock. When the electric lock is implemented in accommodation management, the password of the electric lock has to be changed in response to tenants' check-outs and check-ins, so as to avoid password from theft. However, an administrator has to change the password of the electric lock by operation of the electric lock in person. Therefore, the process to change the password of the conventional electric lock is quite inconvenient for the administrator.

In addition, way to provide different portable devices with authorization of unlocking for the conventional electric lock is executed by a specific portable device belonging to the administrator. In other words, when other portable devices different from the portable device belonging to the administrator are demanded for controlling the electric lock, the other portable devices have to receive a confirm message from the portable device belonging to the administrator. If the portable device belonging to the administrator is lost, the conventional electric lock is not able to be unlocked and reset of the conventional electric lock is required.

SUMMARY OF THE INVENTION

Thus, the present invention provides an electric lock and control method thereof for solving above drawbacks.

According to an embodiment of the present invention, a control method of an electric lock includes the electric lock entering an administrator setting mode after receiving an administrator password; the electric lock generating an authentication code in the administrator setting mode; the electric lock wirelessly receiving a first input from a portable device; the electric lock compare the first input with the authentication code; the electric lock pairing with the portable device and receiving an unique identification information of the portable device when the electric lock determines that the first input matches the authentication code; the electric lock storing the unique identification information of the portable device; and the electric lock performing an unlocking operation when the electric lock receiving a second input and sensing the portable device having the unique identification information within a predetermined distance.

According to an embodiment of the present invention, an electric lock includes a wireless module, a storage unit, a lock unit and a processing unit. The processing unit is electrically connected to the wireless module, the storage unit and the lock unit. Wherein, the processing unit is configured to enter an administrator setting mode after receiving an administrator password, and to generate an authentication code in the administrator setting mode. Wherein, when the electric lock wirelessly receives a first input from a portable device, the processing unit is configured to compare the first input with the authentication code. Wherein, when the processing unit determines that the first input matches the authentication code, the processing unit controls the wireless module to pair with the portable device and receiving an unique identification information of the portable device, and controls the storage unit to store the unique identification information of the portable device. Wherein, when the processing unit receives a second input and senses the portable device having the unique identification information within a predetermined distance, the processing unit controls the lock unit to perform an unlocking operation.

In contrast to the prior art, an administrator of the electric lock of the present invention is able to authorize a temporary user to set up an unlock setting, such that the administrator does not have to change password of the electric lock by operation of the electric lock in person, in order to improve convenience of management of the electric lock. In addition, the electric lock of the present invention performs the unlocking operation according to the unique identification information of the portable device, in order to improve security of usage of the temporary user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
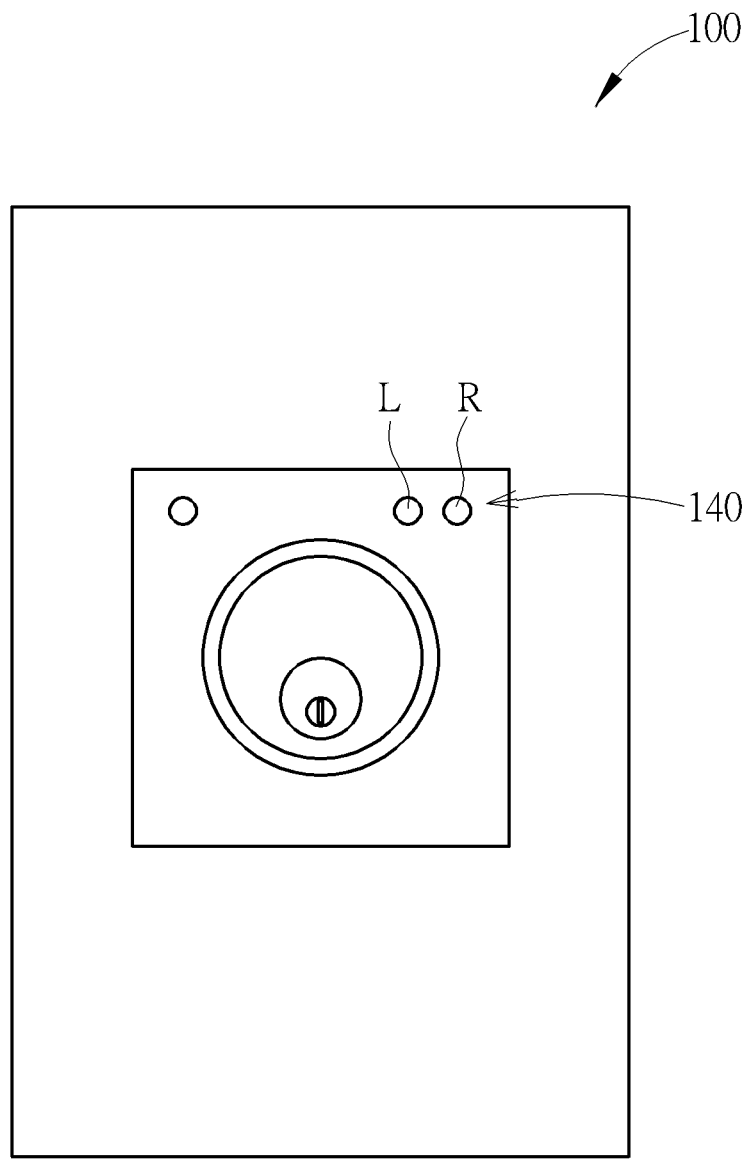
FIG. 1 is a diagram of an electric lock of the present invention.
Figure 2:
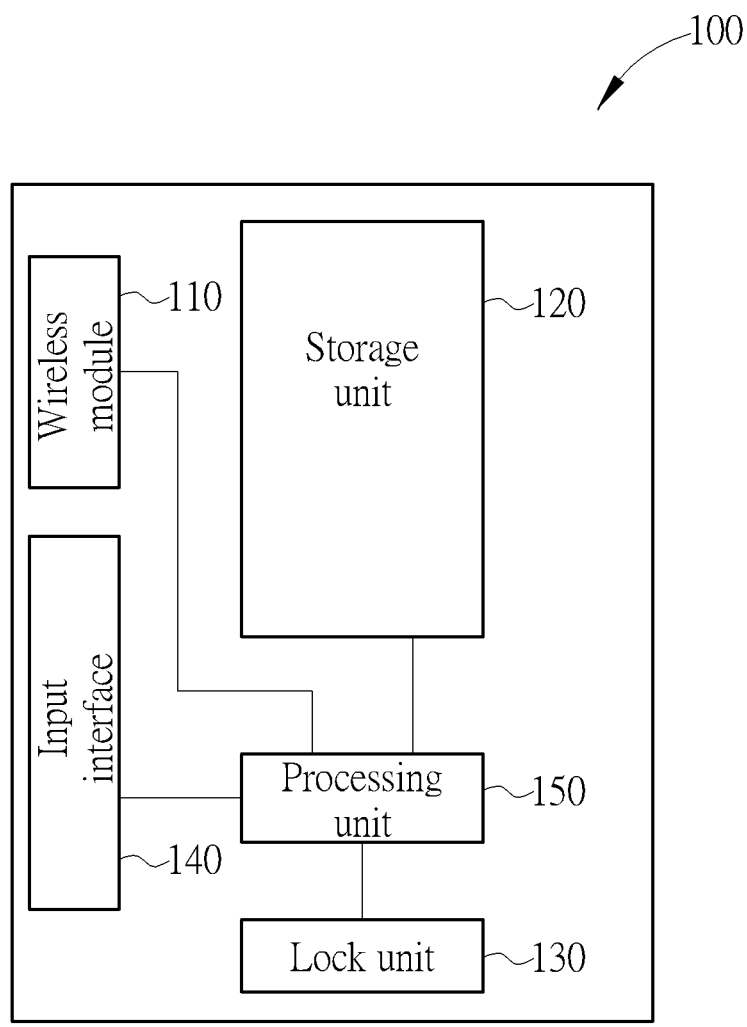
FIG. 2 is a functional block diagram of the electric lock of the present invention.

Please refer to FIG. 1 and FIG. 2. FIG. 1 is a diagram of an electric lock of the present invention. FIG. 2 is a functional block diagram of the electric lock of the present invention. As shown in FIG. 1 and FIG. 2, an electric lock 100 of the present invention includes a wireless module 110, a storage unit 120, a lock unit 130, an input interface 140 and a processing unit 150. The wireless module 110 can be a Bluetooth module or other wireless communication modules. The storage unit 120 is configured to store data (such as a predetermined administrator password). The lock unit 130 is configured to perform a locking operation or an unlocking operation for an object (such as a door). The input interface 140 is configured to receive an external input. In the present embodiment, the input interface 140 comprises a key L and a key R, but the present invention is not limited thereto. The input interface 140 can further include other input elements of different kinds, such as a numeric keypad or touch panel. The processing unit 150 is electrically connected to the wireless module 110, the storage unit 120, the lock unit 130 and the input interface 140, and configured to control operation of the electric lock 100.

Figure 3:
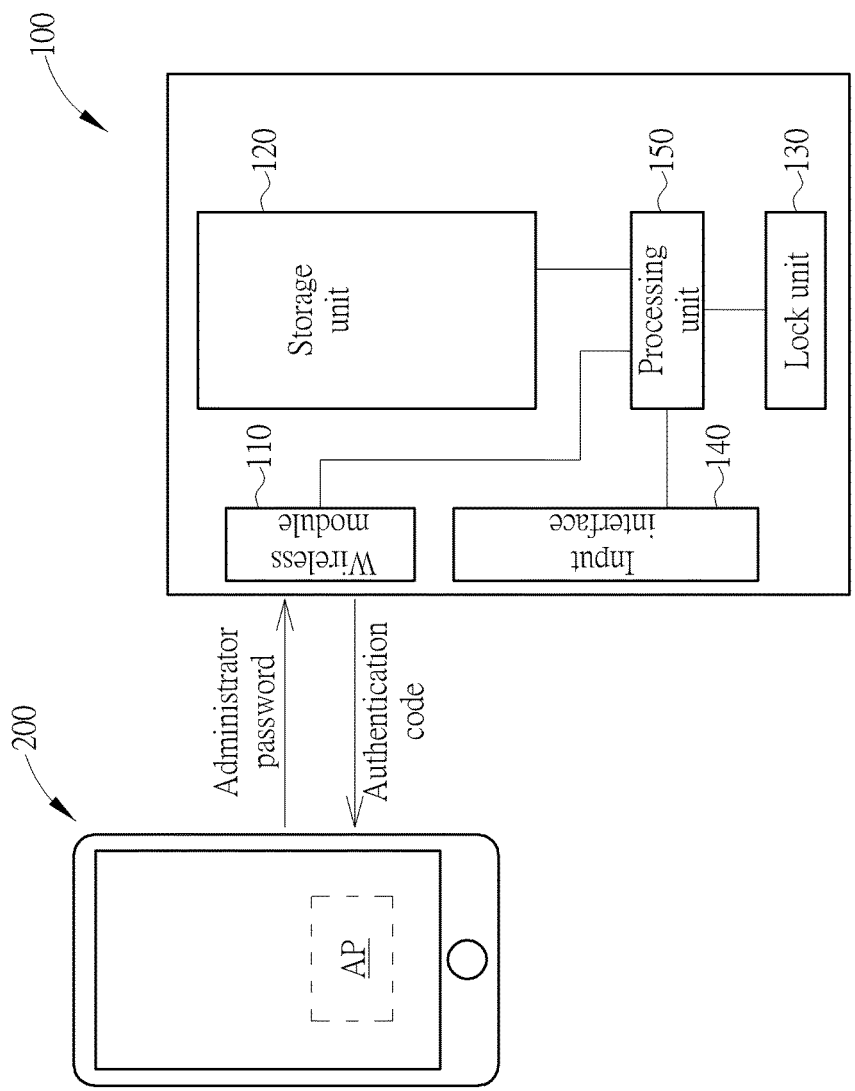
FIG. 3 is a diagram illustrating the electric lock of the present invention entering an administrator setting mode.

Please refer to FIG. 3 as well as FIG. 1 and FIG. 2. FIG. 3 is a diagram illustrating the electric lock of the present invention entering an administrator setting mode. As shown in figures, a portable device 200 is operated to communicate with the electric lock 100 by an administrator. For example, the portable device 200 is installed with an application program AP and communicates with the electric lock 100 through the wireless module 110 of the electric lock 100. The administrator is able to input an administrator password to the application program AP, and the portable device 200 is utilized for transmitting the administrator password to electric lock 100. When the processing unit 150 determines that the administrator password transmitted from the portable device 200 matches the predetermined administrator password stored in the storage unit 120, the processing unit 150 enters an administrator setting mode. On the other hand, regardless of whether the administrator password is inputted from an authenticated/a paired portable device, or even the administrator password is inputted from an unspecified portable device, the processing unit 150 is able to enter the administrator setting mode as long as the processing unit 150 determines that the inputted administrator password matches the predetermined administrator password, such that the electric lock 100 is convenient in management and reduces issues resulting from loss of the portable device. In the administrator setting mode, the administrator is able to utilize the portable device 200 for controlling the processing unit 150 to randomly generate an authentication code (or a plurality of authentication codes). The number of the authentication codes can depend on the administrator's demands. After the authentication code is generated by the processing unit 150, the processing unit 150 is able to control the wireless module 110 to transmit the authentication code to the portable device 200. In addition, the processing unit 150 is further able to control the storage unit 120 to store the authentication code.

Figure 4:
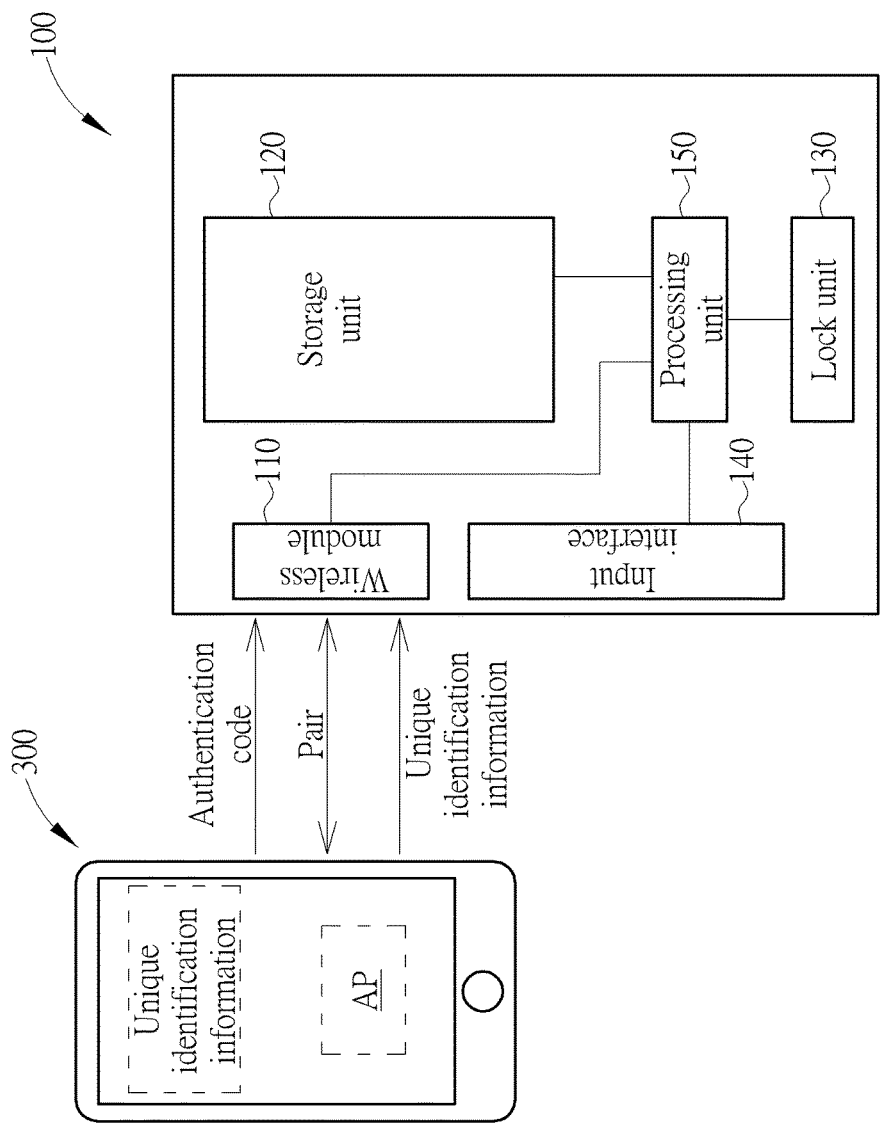
FIG. 4 is a diagram illustrating the electric lock of the present invention entering a user setting mode.

Please refer to FIG. 4 as well as FIG. 1 and FIG. 2. FIG. 4 is a diagram illustrating the electric lock of the present invention entering a user setting mode. When the authentication code is received, the administrator is able to notify a temporary user of the authentication code by SMS or by e-mail. Afterwards, the temporary user is able to set up an unlock setting based on the authentication code. As shown in FIG. 4, a portable device 300 is operated to communicate with the electric lock 100 by the temporary user. For example, the portable device 300 is installed with the application program AP and is able to communicate with the electric lock 100 through the wireless module 110 of the electric lock 100. The temporary user is able to input the authentication code to the application program AP, the portable device 300 is utilized for transmitting the authentication code to the electric lock 100, such that the processing unit 150 is able to compare the authentication code transmitted from the portable device 300 with the authentication code stored in the storage unit 120. When the processing unit 150 determines that the authentication code transmitted from the portable device 300 matches the authentication code stored in the storage unit 120, the processing unit 150 controls the wireless module 110 to be paired with the portable device 300 (e.g., in a Bluetooth paring manner) and receives an unique identification information of the portable device 300. The unique identification information of the portable device 300 can include at least one of a serial number of device, an international mobile equipment identity (IMEI) and a media access control (MAC) address. In addition, the processing unit 150 is further able to control the storage unit 120 to store the unique identification information of the portable device 300.

Figure 5:
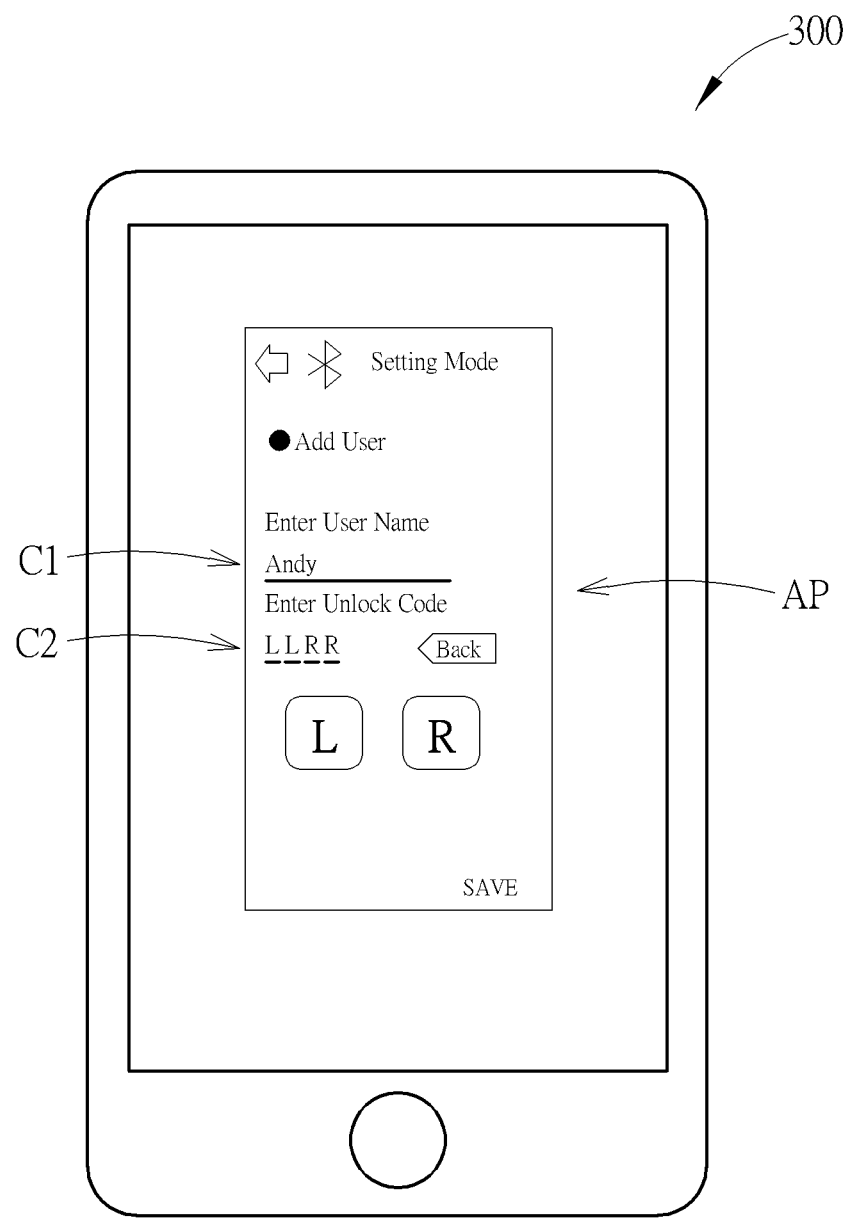
FIG. 5 is a diagram illustrating a portable device in the user setting mode.

On the other hand, when the processing unit 150 determines that the authentication code transmitted from the portable device 300 matches the authentication code stored in the storage unit 120, the processing unit 150 is able to enter a user setting mode. As shown in FIG. 5, in the user setting mode, the temporary user is able to respectively input a user name and an unlock code in a user name column C1 and an unlock code column C2 of the application program AP. The unlock code is a sequence of the key L and the key R required for unlocking the electric lock 100, such as the sequence of LLRR, but the present invention is not limited thereto. The sequence can be set up according to the temporary user personal preferences. In addition, the unlock code is not limited to the sequence of pressing the key L and the key R. When the input interface 140 includes a numeric keypad or a touch panel in other embodiment, the unlock code can be the sequence of pressing the numeric keys or a gesture of touching and dragging. Afterwards, the application program AP transmits the user name and the unlock code inputted by the temporary user to the electric lock 100. When the processing unit 150 receives the user name and the unlock code in the user setting mode, the processing unit 150 is able to control the storage unit 120 to store the user name and the unlock code. In addition, in the user setting mode, the processing unit 150 does not generate the authentication code for avoiding the authority of the temporary user from over expansion. Moreover, when the authentication code is inputted, the processing unit 150 is able to tag the authentication code which has been inputted, so as to prevent the authentication codes from being used repeatedly.

Figure 6:
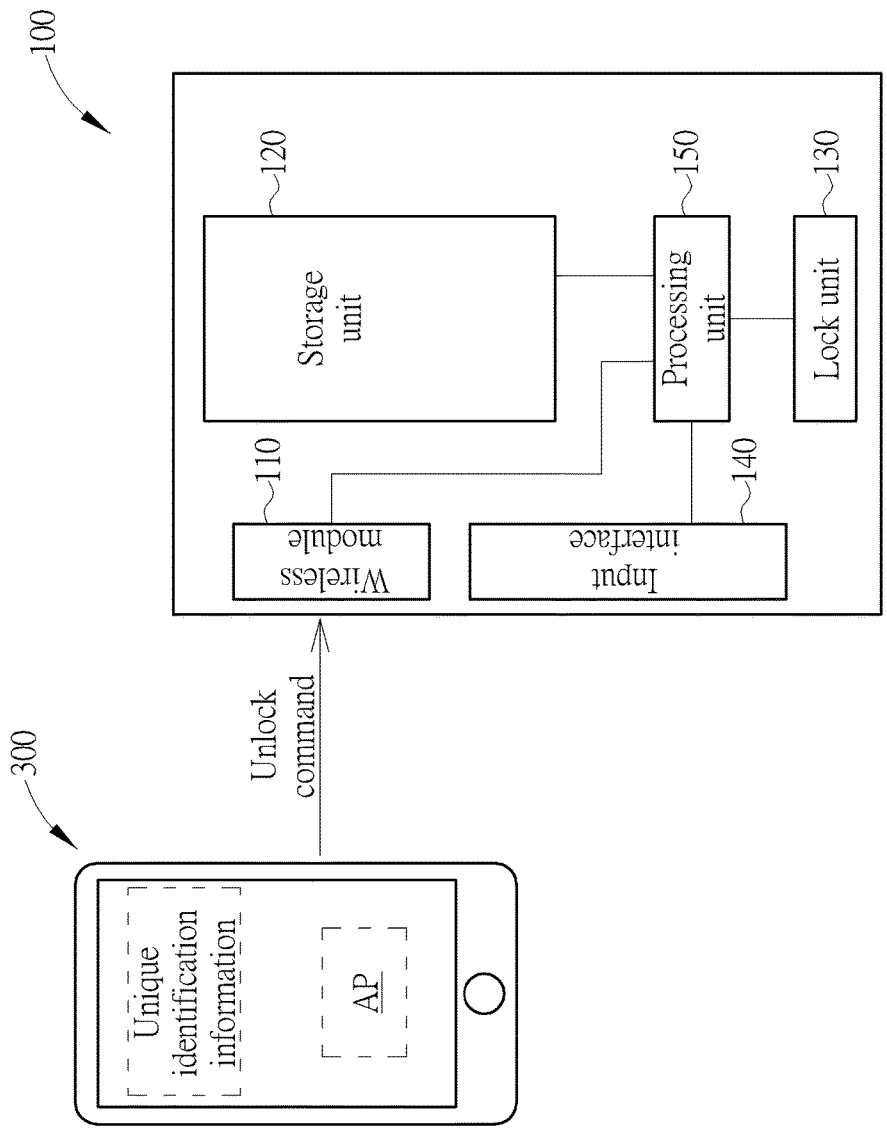
FIG. 6 is a diagram illustrating the electric lock performing an unlocking operation according to a first embodiment of the present invention.

Please refer to FIG. 6. FIG. 6 is a diagram illustrating the electric lock performing the unlocking operation according to a first embodiment of the present invention. As shown in FIG. 6, when the temporary user desires to unlock the electric lock 100, the portable device 300 is utilized for transmitting a unlock command to the electric lock 100 through the application program AP by the temporary user. When the processing unit 150 receives the unlock command and the wireless module 110 senses the portable device 300 having the unique identification information within a predetermined distance, the processing unit 150 is able to control the lock unit 130 to perform the unlocking operation.

Figure 7:
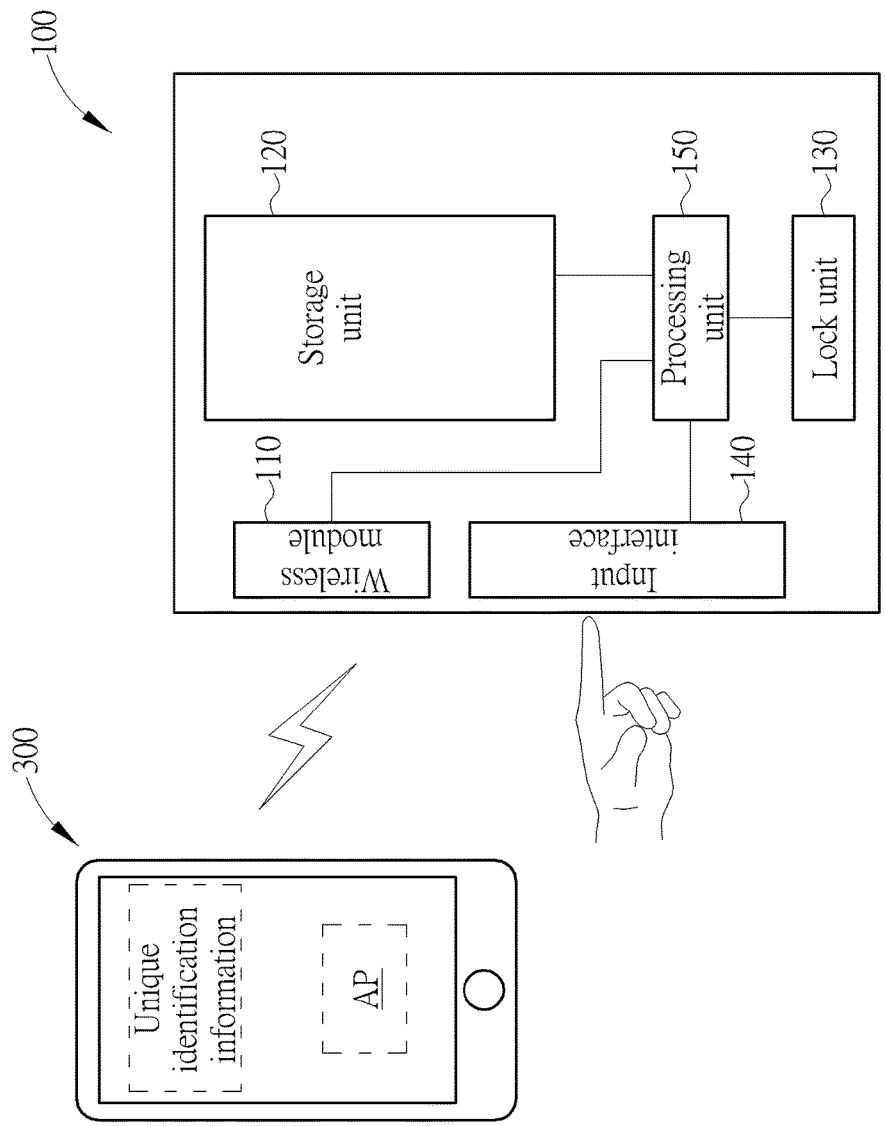
FIG. 7 is a diagram illustrating the electric lock performing the unlocking operation according to a second embodiment of the present invention.

On the other hand, referring to FIG. 7, FIG. 7 is a diagram illustrating the electric lock performing the unlocking operation according to a second embodiment of the present invention. As shown in FIG. 7, when the temporary user desires to unlock the electric lock 100, the temporary user can press the key L and key R of the input interface 140 according the sequence of the unlock code set in advance. When the processing unit 150 determines that the sequence of the key L and the key R matches one of the unlock code stored in the storage unit 120 and when the wireless module 110 senses the portable device 300 having the unique identification information (corresponding to the inputted unlock code) within a predetermined distance, the processing unit 150 is able to control the lock unit 130 to perform the unlocking operation. As such, the temporary user is able to unlock the electric lock 100 without operation of the portable device 300.

According to the above arrangement, the administrator of the electric lock 100 of the present invention can authorize the temporary user to set up the unlock setting, without changing the password by the operation of the electric lock 100 in person. In addition, after the temporary user finishes the unlock setting, the electric lock 100 is able to perform the unlocking operation through the portable device 300 having the unique identification information. Since the unique identification information of the portable device 300 is unique, it is difficult to crack the unlock setting set by the temporary user.

In addition, in the administrator setting mode, the administrator is able to further set a valid period corresponding to the authentication code through the application program AP of the portable device 200. When the temporary user desires to utilize the portable device 300 to unlock the electric lock 100 over expiration of the valid period, the processing unit 150 does not control the lock unit 130 to perform the unlocking operation according to the unique identification information of the portable device 300.

Moreover, in the administrator setting mode, the administrator is able to further set a limit of usage count corresponding to the authentication code through the application program AP of the portable device 200. When a number of times of the portable device 300 used by the temporary user for unlocking the electric lock 100 exceeds the limit of usage count, the processing unit 150 does not control the lock unit 130 to perform the unlocking operation according to the unique identification information of the portable device 300.

On the other hand, when processing unit 150 controls the lock unit 130 to perform the unlocking operation, the processing unit 150 can further control the storage unit 120 to store the user name and an unlock time slot of the portable device 300. The administrator is able to access an unlocked history of the electric lock 100 by means of connection between the portable device 200 and the electric lock 100. Alternatively, the processing unit 150 can upload the unlocked history of the electric lock 100 to a cloud server, such that the administrator is able to monitor the unlocked history of the electric lock 100 easily.

In the present embodiment, the portable device 200 of the administrator is different from the portable device 300 of the temporary user, but the present invention is not limited thereto. In other embodiments, the portable device 200 of the administrator can be the same as the portable device 300 of the temporary user.

Figure 8:
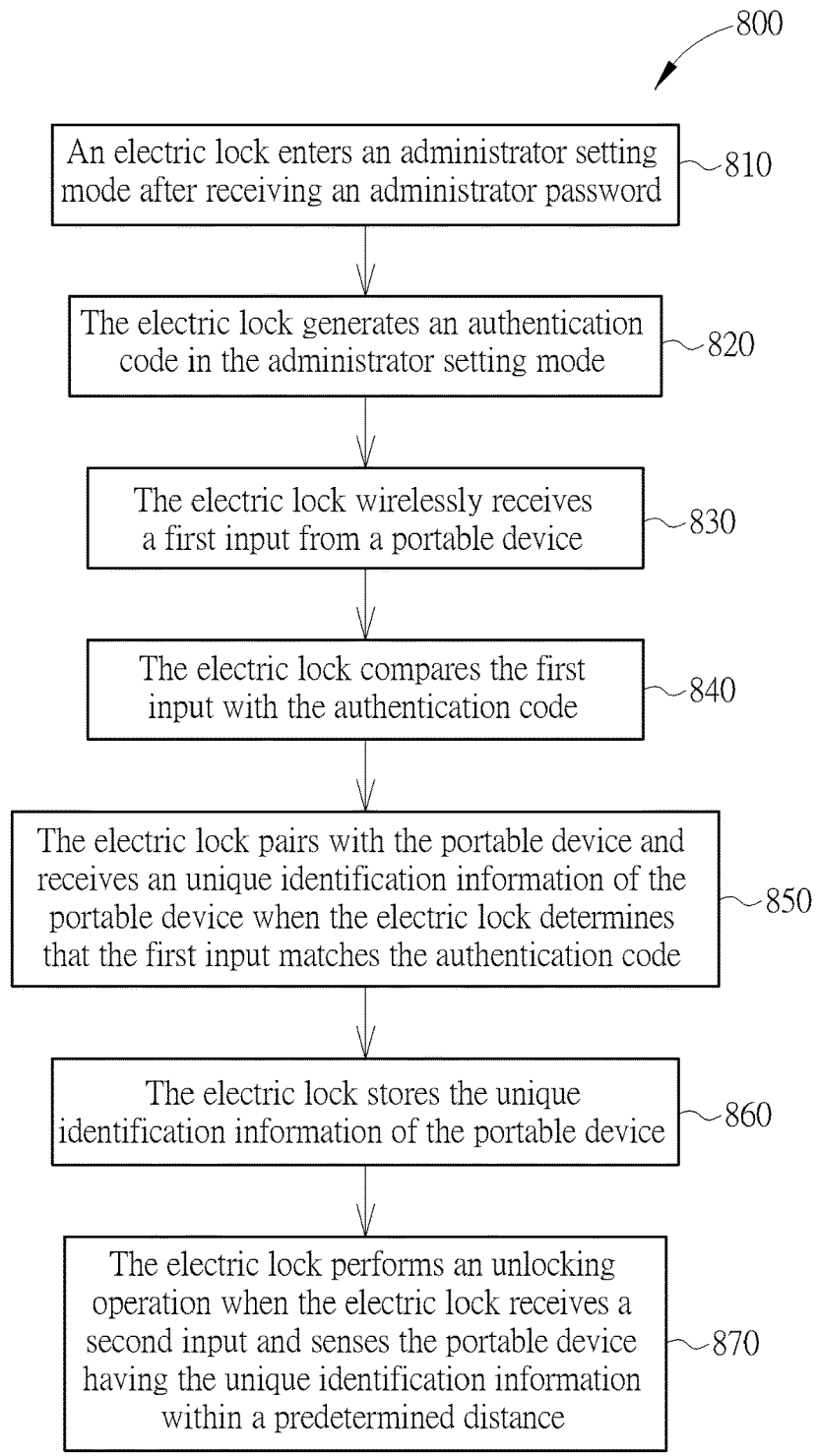
FIG. 8 is flowchart illustrating a control method of the electric lock of the present invention.

Please refer to FIG. 8. FIG. 8 is a flowchart 800 illustrating a control method of the electric lock of the present invention. As shown in FIG. 8, the control method of the present invention includes the following steps of:

Step 810: An electric lock enters an administrator setting mode after receiving an administrator password.

Step 820: The electric lock generates an authentication code in the administrator setting mode.

Step 830: The electric lock wirelessly receives a first input from a portable device.

Step 840: The electric lock compares the first input with the authentication code.

Step 850: The electric lock pairs with the portable device and receives an unique identification information of the portable device when the electric lock determines that the first input matches the authentication code.

Step 860: The electric lock stores the unique identification information of the portable device.

Step 870: The electric lock performs an unlocking operation when the electric lock receives a second input and senses the portable device having the unique identification information within a predetermined distance.

On the other hand, the order of the control method of the present invention is not limited to the order of the above steps. The order of the above steps can be changed. Moreover, the steps of the control method of the present invention need not be in the exact order shown.

In contrast to the prior art, an administrator of the electric lock of the present invention is able to authorize to a temporary user to set up an unlock setting, such that the administrator does not have to change password of the electric lock by operation of the electric lock in person, in order to improve convenience of management of the electric lock. In addition, the electric lock of the present invention performs the unlocking operation according to the unique identification information of the portable device, in order to improve security of usage of the temporary user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an electric lock, comprising:
the electric lock entering an administrator setting mode after receiving an administrator password;
the electric lock generating an authentication code in the administrator setting mode;
the electric lock wirelessly receiving a first input from a portable device;
the electric lock comparing the first input with the authentication code;
the electric lock pairing with the portable device and receiving an unique identification information of the portable device when the electric lock determines that the first input matches the authentication code;
the electric lock storing the unique identification information of the portable device; and
the electric lock performing an unlocking operation when the electric lock receiving a second input and sensing the portable device having the unique identification information within a predetermined distance.

2. The control method of claim 1, wherein the second input is an unlock command transmitted from the portable device to the electric lock.

3. The control method of claim 1, further comprising:
the electric lock entering a user setting mode when the electric lock determines that the first input matches the authentication code; and
the electric lock receiving an unlock code in the user setting mode;
wherein the second input is the unlock code inputted to an input interface of the electric lock.

4. The control method of claim 3, wherein the electric lock does not generate the authentication code in the user setting mode.

5. The control method of claim 3, further comprising the electric lock receiving a user name of the portable device in the user setting mode.

6. The control method of claim 5, further comprising the electric lock storing the user name of the portable device and an unlocked time slot when performing the unlocking operation.

7. The control method of claim 1, further comprising:
the electric lock setting a valid period corresponding to the authentication code in the administrator setting mode;
the electric lock does not perform the unlocking operation according to the unique identification information of the portable device when the valid period is expired.

8. The control method of claim 1, further comprising:
the electric lock setting a limit of usage count corresponding to the authentication code in the administrator setting mode;
the electric lock does not perform the unlocking operation according to the unique identification information of the portable device when a number of times of the portable device used for unlocking the electric lock exceeds the limit of usage count.

9. The control method of claim 1, wherein the unique identification information of the portable device comprises at least one of a serial number of device, an international mobile equipment identity (IMEI) and a media access control (MAC) address.

10. An electric lock, comprising:
a wireless module;
a storage unit;
a lock unit; and
a processing unit electrically connected to the wireless module, the storage unit and the lock unit;
wherein the processing unit is configured to enter an administrator setting mode after receiving an administrator password, and to generate an authentication code in the administrator setting mode;
wherein when the electric lock wirelessly receives a first input from a portable device, the processing unit is configured to compare the first input with the authentication code;
wherein when the processing unit determines that the first input matches the authentication code, the processing unit controls the wireless module to pair with the portable device, receives an unique identification information of the portable device and controls the storage unit to store the unique identification information of the portable device;
wherein when the processing unit receives a second input and the wireless module senses the portable device having the unique identification information within a predetermined distance, the processing unit controls the lock unit to perform an unlocking operation.

11. The electric lock of claim 10, wherein the second input is an unlock command transmitted from the portable device to the electric lock.

12. The electric lock of claim 10, wherein:
the processing unit is configured to enter a user setting mode to receive an unlock code when the processing unit determines that the first input matches the authentication code; and
the electric lock further comprises an input interface, the second input is the unlock code inputted to the input interface of the electric lock.

13. The electric lock of claim 12, wherein the processing unit does not generate the authentication code in the user setting mode.

14. The electric lock of claim 12, wherein the processing unit is further configured to receive a user name of the portable device in the user setting mode.

15. The electric lock of claim 14, wherein the processing unit is further configured to store the user name of the portable device and an unlocked time slot when the processing unit performs the unlocking operation.

16. The electric lock of claim 10, wherein:
the processing unit is further configured to set a valid period corresponding to the authentication code in the administrator setting mode; and
the processing unit does not perform the unlocking operation according to the unique identification information of the portable device when the valid period is expired.

17. The electric lock of claim 10, wherein:
the processing unit is further configured to set a limit of usage count corresponding to the authentication code in the administrator setting mode; and
the processing unit does not perform the unlocking operation according to the unique identification information of the portable device when a number of times of the portable device used for unlocking the electric lock exceeds the limit of usage count.

18. The electric lock of claim 10, wherein the unique identification information of the portable device comprises at least one of a serial number of device, an international mobile equipment identity (IMEI) and a media access control (MAC) address.

* * * * *